Figure 7:
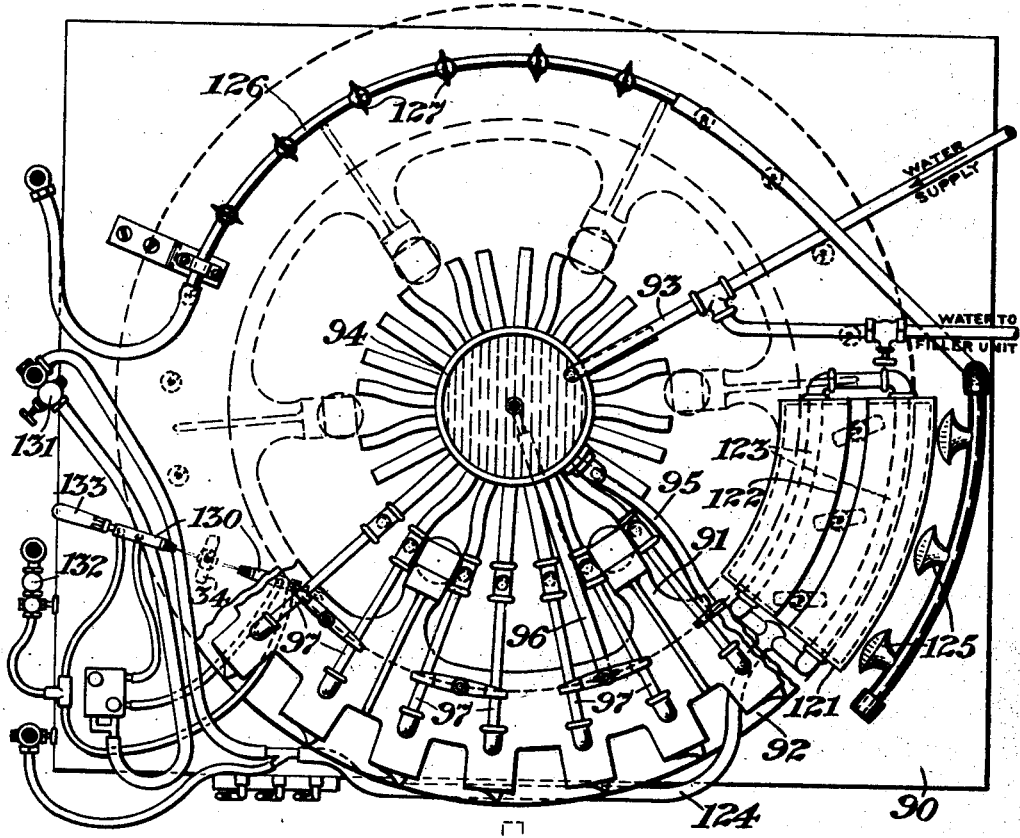

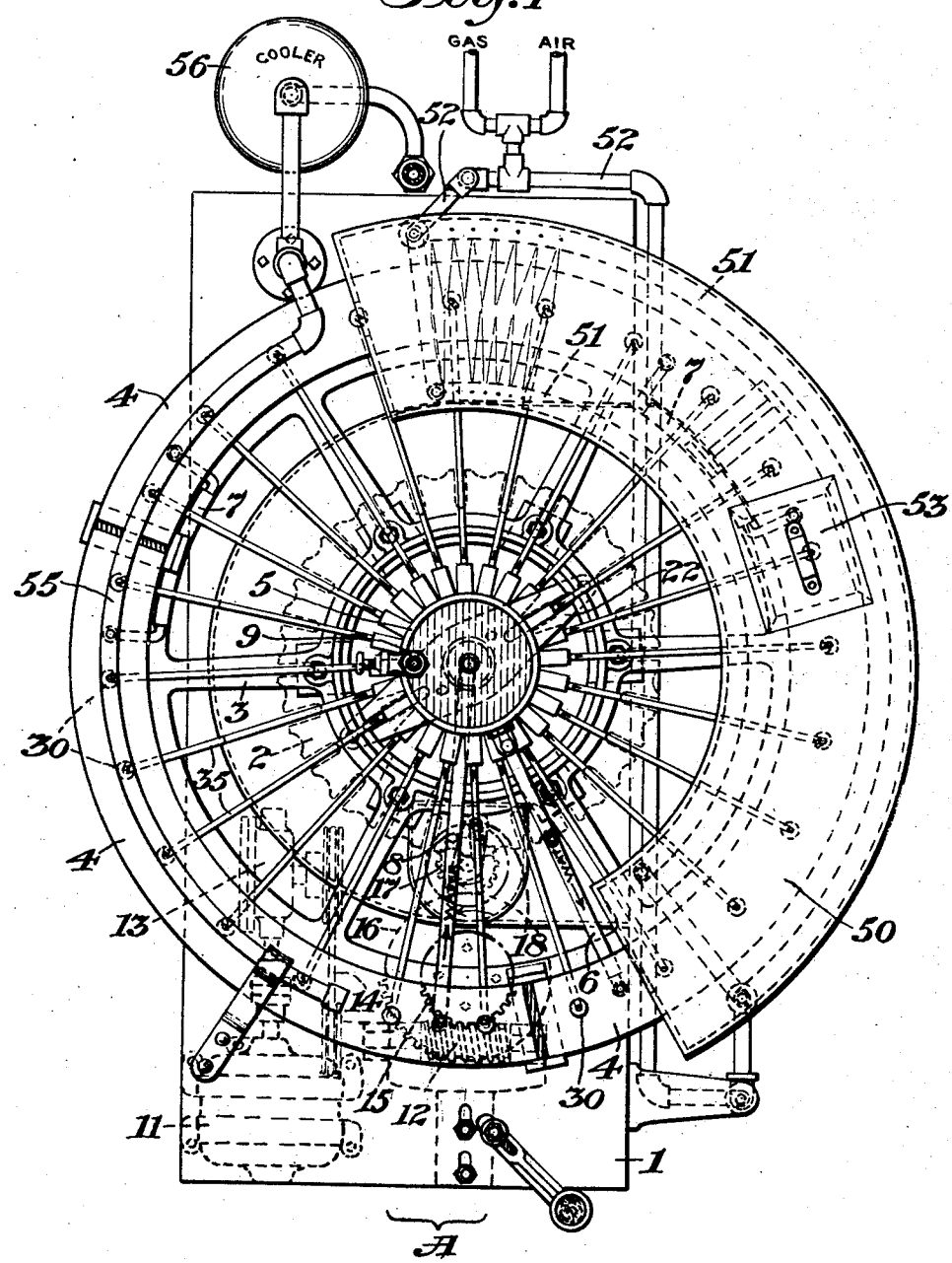

Nov. 17, 1931.    W. R. WALKER    1,831,935
METHOD OF AND APPARATUS FOR MAKING LIQUID ELECTRODE DEVICES
Filed April 29, 1929    6 Sheets-Sheet 2
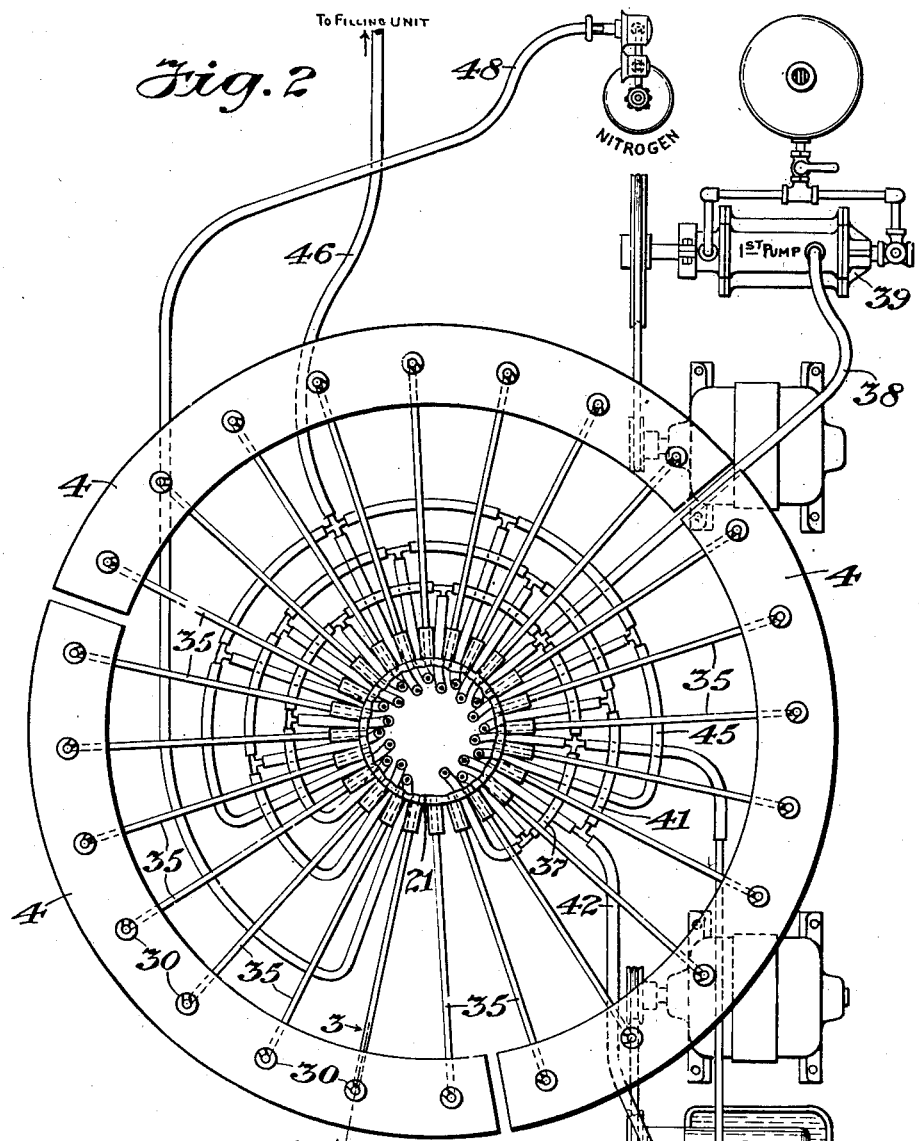
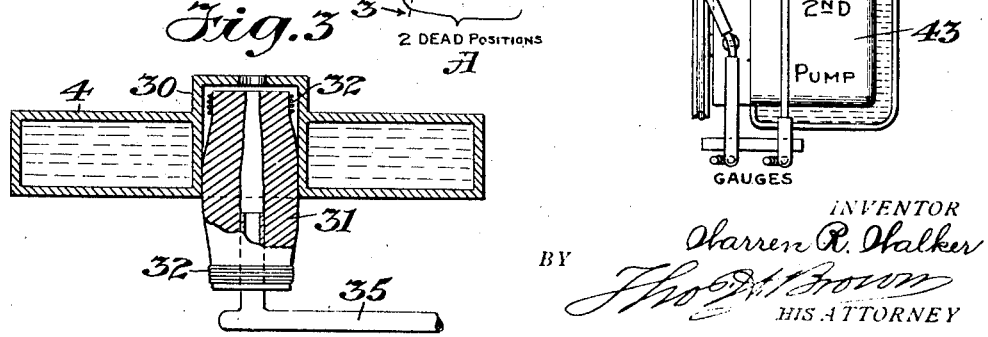

Nov. 17, 1931.  W. R. WALKER  1,831,935
METHOD OF AND APPARATUS FOR MAKING LIQUID ELECTRODE DEVICES
Filed April 29, 1929   6 Sheets-Sheet 3
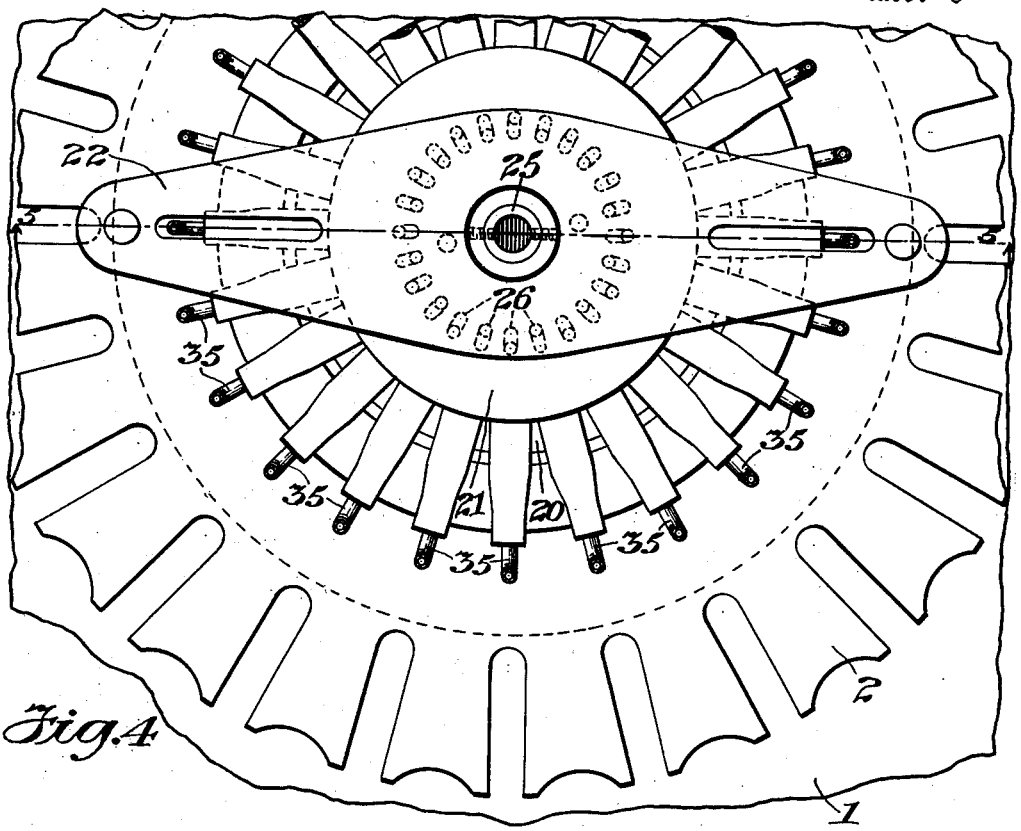
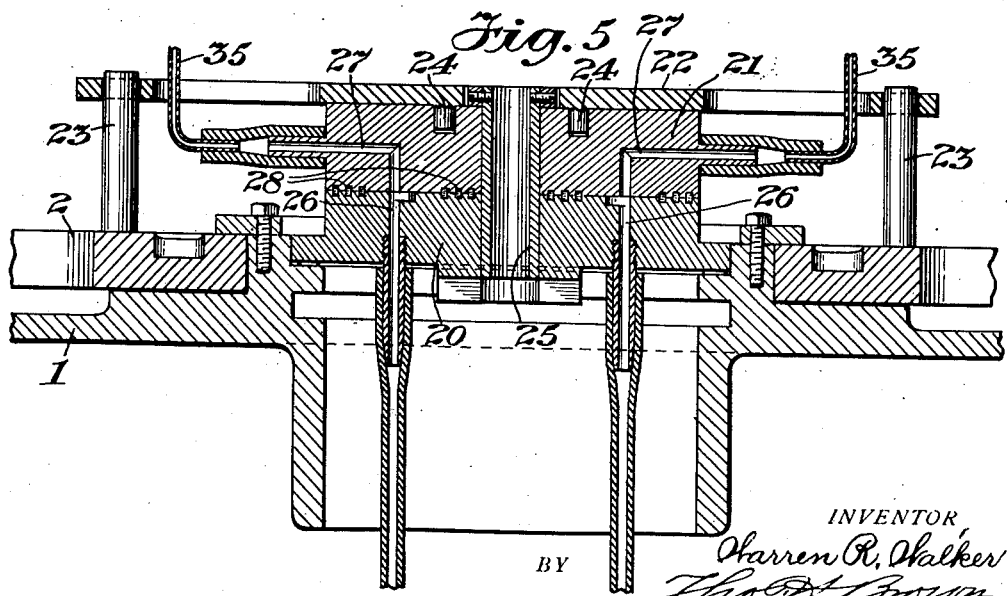
INVENTOR
Warren R. Walker
BY
HIS ATTORNEY

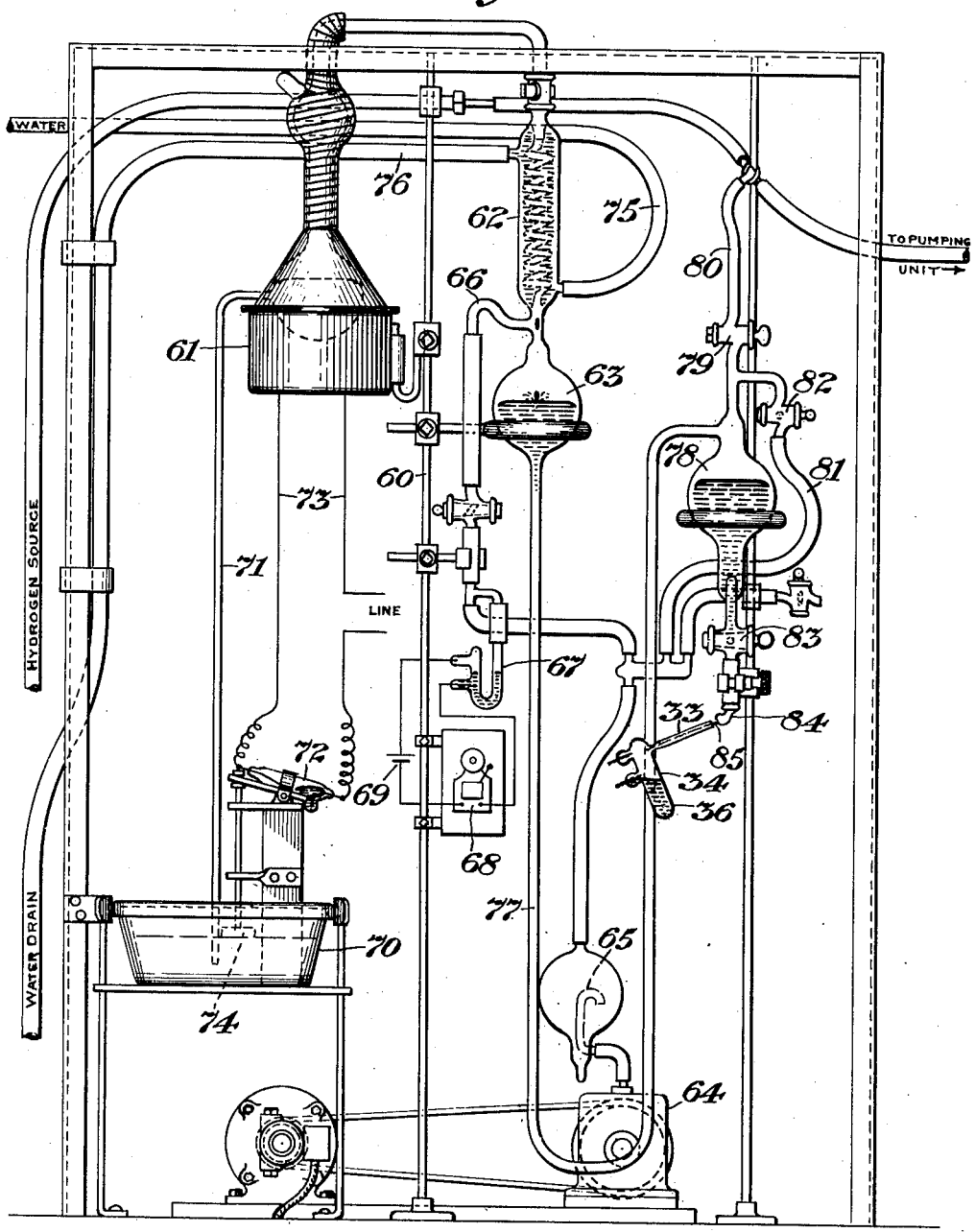

Nov. 17, 1931.    W. R. WALKER    1,831,935
METHOD OF AND APPARATUS FOR MAKING LIQUID ELECTRODE DEVICES
Filed April 29, 1929    6 Sheets-Sheet 5

INVENTOR
Warren R. Walker
BY
HIS ATTORNEY

Nov. 17, 1931.  W. R. WALKER  1,831,935
METHOD OF AND APPARATUS FOR MAKING LIQUID ELECTRODE DEVICES
Filed April 29, 1929   6 Sheets-Sheet 6
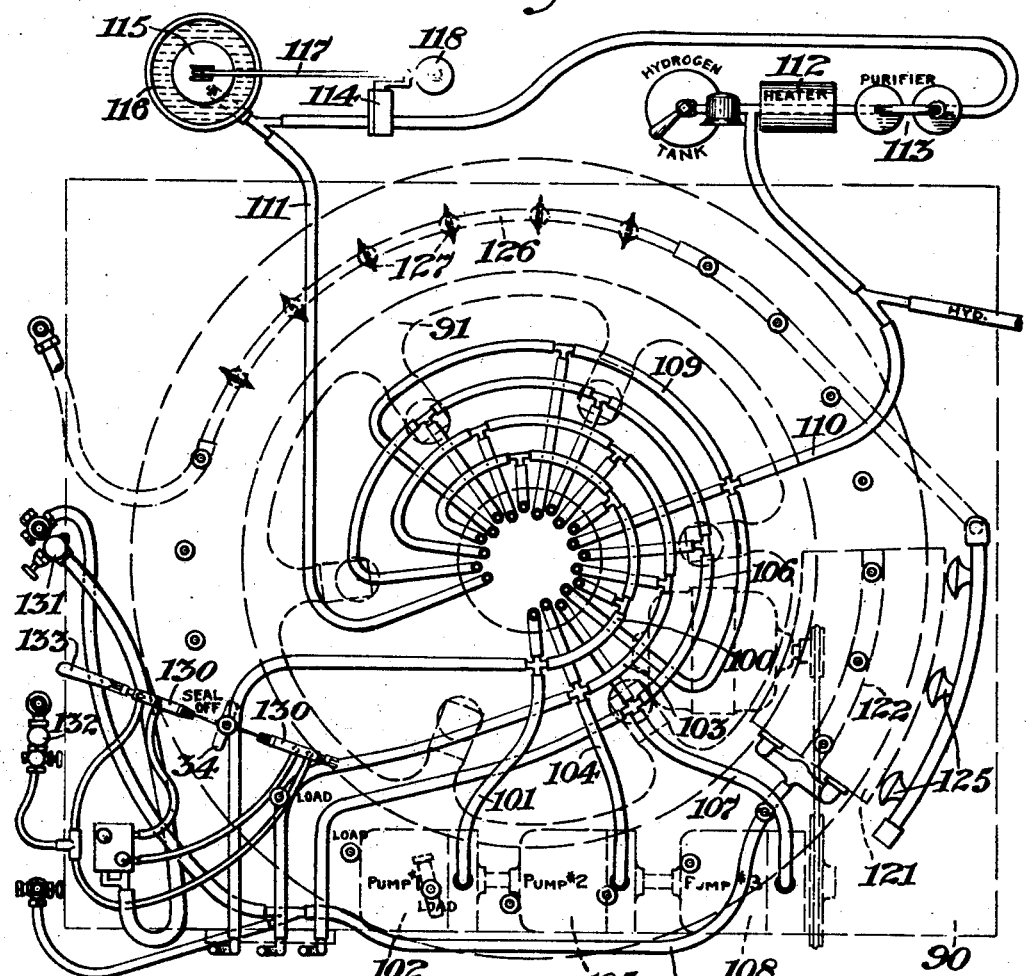
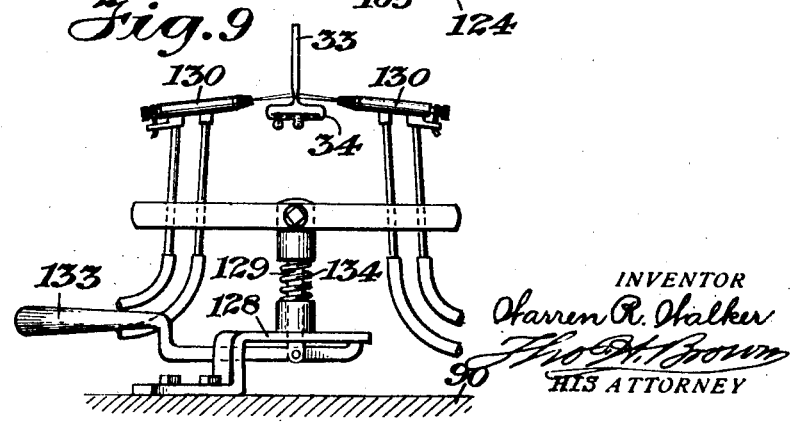
INVENTOR
Warren R. Walker
HIS ATTORNEY Patented Nov. 17, 1931

1,831,935

UNITED STATES PATENT OFFICE

WARREN R. WALKER, OF SHORT HILLS, NEW JERSEY, ASSIGNOR TO GENERAL ELECTRIC VAPOR LAMP COMPANY, OF HOBOKEN, NEW JERSEY, A CORPORATION OF NEW JERSEY

METHOD OF AND APPARATUS FOR MAKING LIQUID ELECTRODE DEVICES

Application filed April 29, 1929. Serial No. 358,910.

The present invention relates to electric switches, and particularly to the manufacture of switches of the liquid flow type.

The main object of the invention is to provide an improved method of and apparatus for evacuating the envelopes of liquid flow switches or similar devices, and of introducing the liquid therein, but other objects and advantages will appear in the course of the following specification. The invention consists in a new and original arrangement and combination of steps in the process, and in new and novel combinations of parts in the apparatus, as hereinafter set forth and claimed.

Liquid flow switches, particularly of the mercury type, are commonly manufactured with a hermetically sealed envelope, within which the liquid flows either in a vacuum or in an arc suppressing atmosphere. It has been found that water vapor, oxygen and other impurities which may be present in these envelopes due to their contact with air during manufacture are exceedingly detrimental to the product, hence great care has been exercised in the past to insure their removal. The method heretofore in use has been to seal the envelope to an exhaust system, the envelope being enclosed within an oven during evacuation. The occluded gases, water vapor, and other impurities were driven off by the combined action of the vacuum and the heating of the walls. Hydrogen was then admitted to the envelope for flushing purposes, and the envelope again evacuated, this cycle being repeated several times, the heating being continued throughout the operations. Mercury was then introduced into the envelope from some other point in the vacuum system while the vacuum was maintained, after which the envelope was again heated just to the boiling point of the mercury, a gaseous filling such as hydrogen being admitted if desired, and the envelope sealed off. This method has been slow, and by its nature rendered the uniformity of the product uncertain. Some method of mechanically performing the process, or at least parts of it, both to speed up production and to improve the product has long been sought, but the necessity of inserting the mercury after the preliminary treating of the envelope, which is necessarily done at temperatures above the boiling point of mercury, without admitting undesired impurities at the same time has prevented a successful solution of the problem. I have discovered that the initial heat treatment with pumping and flushing may be performed while connected to one exhaust system, such as may be provided on an automatic machine of my invention which gives the proper sequence of operations, the envelope being cooled to room temperature or below and filled with nitrogen at atmospheric pressure just before being removed from the machine. The proper quantity of mercury may then be admitted, an equal volume of nitrogen being displaced. The switch is then placed upon a second exhaust system, preferably an automatic exhaust machine of my invention which performs the final steps of heating, pumping, flushing, and filling with the desired gas, whereupon the envelope is sealed off as before. It has been found that if the tubulation through which the switch is pumped is reasonably restricted the diffusion of air into the nitrogen within the envelope is negligible, even with the lapse of several hours, due to the fact that the specific gravity of nitrogen is only slightly greater than that of air, so that it is now entirely possible to test each switch to insure that the proper quantity of mercury has been placed in the switch before the envelope is sealed. As a result the cause of many rejections on final inspection has been eliminated. In addition, since each switch is treated exactly like every other one, substantial uniformity of product is now obtainable.

In the manufacture of a mercury switch according to a preferred form of my invention a tubulated switch envelope is placed upon an automatic exhaust machine. This machine has an intermittently rotating water cooled head which carries a plurality of oiled rubber tubes for gas tight connection to the tubulations of the switch envelopes. As the head rotates the envelopes are carried into an oven where they are heated sufficiently to drive off all occluded gases and water vapor. The rotation of the head also connects the envelope with a succession of ports through which the envelopes are in turn subjected to a rough exhaust, a final exhaust and a flushing atmosphere such as hydrogen, this exhausting and flushing being repeated several times. As each envelope nears the point of removal it is cooled by a blast of air until it is at or below room temperature, and at the last port the exhausted envelope is filled with nitrogen at atmospheric pressure. Due to the small orifice and the fact that nitrogen has only a slightly higher specific gravity than air there will be no appreciable diffusion of air into the nitrogen, hence the envelope may now be removed from the exhaust system without deleterious effects. Mercury which has been distilled in a vacuum and stored in a hydrogen atmosphere in order to eliminate undesirable impurities is then admitted to the envelope in proper quantity, an equal volume of nitrogen being displaced during the process. The switch is next tested to insure that it will operate to open and close the circuit within definite tolerance limits, an operation which has been impossible with prior methods of exhaust, after which it is placed upon a second automatic exhaust machine similar to the first. Due to the presence of the mercury the envelope must, of course, be suspended below the water cooled head of this machine. The period of heating is shorter than on the first exhaust machine and the oven temperature is such as to avoid distillation of mercury from the envelope. As the head rotates the envelope is in turn connected to a rough exhaust pump, an intermediate exhaust pump and a final exhaust pump in order to obtain a high vacuum. The envelope is then flushed, preferably with hydrogen, the exhausting and flushing being repeated several times. As the envelope nears the point of removal it is again cooled to room temperature, and hydrogen or other desired arc suppressing atmosphere is admitted to the exhausted envelope at slightly less than atmospheric pressure, as by a gasometer which continuously maintains a pressure of one inch of mercury less than atmospheric pressure. The envelope is then sealed off in the usual manner and removed from the machine. If desired, the last gas filling may be omitted.

Figure 10:
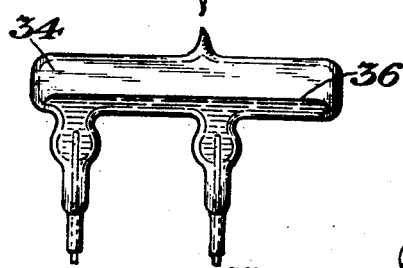

In the accompanying drawings, I have shown for purposes of illustration, one form of apparatus which I have devised for performing my new process. In these drawings;

Fig. 1 is a plan view of the first machine of the unit, which exhausts and flushes the switch envelopes and gives them their nitrogen filling, Fig. 2 is a similar view of the machine of Fig. 1 with parts thereof removed and the rotary valve partly broken away to show the manifold connections, Fig. 3 is a sectional view taken along the line 3—3 of Fig. 2, Fig. 4 is a detailed plan view of the rotary valve of the machine of Fig. 1, Fig. 5 is a sectional view taken on the line 5—5 of Fig. 4, Fig. 6 is a view of the mercury distilling and storing apparatus, Fig. 7 is a plan view with parts thereof broken away, of the last machine of the unit, which exhausts and flushes the switches, fills them with the arc quenching gas and seals them off, Fig. 8 is a schematic view of the machine of Fig. 7 showing the manifold connections, Fig. 9 is an elevation of the sealing-off burner on the machine of Fig. 7, and Fig. 10 is a view of the product.

In these drawings, with particular reference to Figs. 1–5, a bed plate 1 supports a Geneva gear 2 upon a suitable bearing surface. The Geneva gear 2 in turn supports the spider 3 which carries at its outer edge the hollow arcuate segments 4. Water for cooling the segments 4 flows by gravity from a tank 5 centrally supported upon the spider 3 through the pipe 6 to one of the segments 4, thence from segment to segment via the tubes 7, returning through the pipe 8 to a centrally located point where it discharges into a suitable disposal system. Water is admitted to the tank 5 by means of a pipe 9 from any convenient source.

A motor 11 drives a worm 12 through a reducing gear 13 and belt 14. The worm 12 meshes with a gear 15 which is mounted on the same shaft with an intermittent gear 16 having teeth on only one segment thereof which alternately drives and locks a gear 17 carrying a crank arm 18 which in turn alternately drives and locks the Geneva gear 2. With this construction continuous rotation of the motor 11 results in the intermittent rotation of the segments 4 in a counterclockwise direction.

A circular plate 20, which serves as the fixed part of a rotary valve, is mounted on the bed plate 1 concentrically with the Geneva gear 2, and extends through a central opening in said Geneva gear. A similar plate 21 which rests on top of the plate 20 serves as the moving part of the rotary valve. A bar 22 which is loosely secured by means of the pins 23 for rotation with the Geneva gear rests upon the upper surface of the plate 21, engaging said plate for rotation therewith by means of the pins 24. The plate 21 thus rotates with the Geneva gear 2. A sleeve 25 maintains the alignment of the plates 20 and 21. The plate 20 has a plurality of ports 26 therein spaced at the same angular intervals as the positions of rest of the Geneva gear 2. The plate 21 has the corresponding ports 27, each of which registers with a port 26 at each rest position. A series of oil glands 28 serve to seal the two plates 20 and 21 of the rotary valve against leakage therebetween.

A plurality of openings 30 at the same angular intervals as the ports 26 of the rotary valve extend through the segments 4. Each of said openings 30 has a short length of thick walled rubber tubing 31 snugly fitted therein, each end of the tubing being somewhat compressed by elastic means, such as the rubber bands 32, in order to overcome the tendency of the tubing 31 to eject glass tubing inserted therein. It has been found that this tendency, which is due to an end thrust by the stretched tubing, can also be eliminated by the insertion in the center of the tube 31 of a short piece of tubing of the same diameter as the tubing to be inserted in the use of the apparatus. The upper opening of each tube 31 is adapted to receive the tubulation 33 of an envelope 34 which is to be exhausted, the tubulation being greased to make an air tight connection therewith. The lower end of each tube 31 is connected by a tube 35 to a port 27 in the rotary valve plate 21, successive tubes 31 being connected to successive ports 27. In this manner each envelope 34 is successively connected with each of the ports 26 as the Geneva gear 2 is rotated.

The connection of these ports 26 will now be described. The two ports 26 which are connected by the rotary valve to the tubes 35 which terminate at the positions marked "A" are blanks, leading only to a piece of closed tubing. Passing in a counterclockwise direction, the next two ports 26, the fifth port 26, and every third port 26 thereafter, are connected through a manifold 37 and tube 38 to a suitably driven vacuum pump 39 of capacity sufficient to substantially evacuate all the system connected thereto during the rest interval of the Geneva gear 2. The second port 26, and every third port 26 thereafter, is connected through a manifold 41 and tube 42 to another vacuum pump 43, suitably driven, which is designed to maintain and perfect the vacuum produced in the envelopes 24 when connected to the pump 39. The fourth port 26 from the position A and every third port 26 thereafter, with the exception of the last port 26, is connected through the manifold 45 and tube 46 to a suitable source of hydrogen at approximately atmospheric pressure. The last port 26 is connected through a tube 48 to a suitable source of nitrogen at atmospheric pressure.

An arcuate oven 50 which has a curvature similar to that of the segments 4 is supported with the bottom of said oven in close proximity to the top of said segments, and extends from a point between the first and second positions counterclockwise from the position A to a point approximately 170° therefrom. Said oven 50 is heated to about 500° C. by flames from the perforated pipes 51, which are supplied with a suitable mixture of gas and air at either end through the pipes 52. A ventilation opening 53 is provided in the top of the oven, to allow circulation of the gases when desired. Each end of the oven 50 has a suitable opening for the admission of the switch bodies 34 carried by the segments 4, and a continuous slit in the bottom of said oven allows passage of the tubulations 33.

An air pipe 55 extends above the openings 30 from the end of the oven 50 to the position A, and has openings in the bottom thereof over each position of rest of the openings 30 which direct a current of air upon the switch bodies 34 carried by the segments 4 to cool them. Air under pressure is supplied to said pipe 55 from a convenient source through a cooler 56 in which the air passes through a moistened wicking.

In Fig. 5 a standard 60 supports a mercury still 61 and a condenser 62 which is connected to said still. Below said condenser 62 is a storage reservoir 63. A vacuum pump 64 is connected to a point between the condenser 62 and the reservoir 63 through a trap 65 and the tubing 66, the latter being so connected as not to intercept mercury descending from the condenser 62. A mercury manometer 67 having contacts therein which are designed to be closed by the mercury whenever the vacuum falls below a predetermined value is connected to the tube 66. An alarm bell 68 and a battery 69 are included in the circuit with the contacts of the manometer 67, the bell 69 thus giving the alarm whenever the vacuum fails, allowing the operator to take proper steps to shut down the still. A continuous supply of mercury for the still 61 is provided by the reservoir 70 from which the mercury as required is forced by barometric pressure into the still 61 through the tubing 71. A mercury switch 71, which is in series with one of the leads 73 to the electric heater of the still 61 is actuated by a float 74 in the reservoir 70, said switch 72 moving to an open position when the mercury supply in said reservoir 70 falls below a predetermined amount, thus shutting down the still 61. Cooling water for the condenser 62 is provided from a convenient source through the tube 75, the water passing out to a suitable drain through the tube 76.

The storage reservoir 63, in which the distilled mercury is accumulated is connected through a barometric trap 77 to the top of a storage chamber 78, mercury flow thereto normally being prevented by the pressure of the hydrogen atmosphere which is present in said chamber 78, hydrogen being supplied thereto through the stop cock 79 and tube 80 from a convenient source. The vacuum pump 65 is also connected to the top of the chamber 78 through a tube 81 and stop cock 82, said stop cock 82 being normally closed.

To draw mercury from the reservoir 63 to the chamber 78 it is necessary to close stop cock 79 and open stop cock 82, the mercury then flowing by gravity to the chamber 78, the stop cocks being restored to normal when the desired amount of mercury has been transferred. A stop cock 83, tube 84, and a hollow needle 85 which will pass through the constriction in the tubulation 33 is provided to draw off the mercury for utilization in the switch envelopes 34.

Adjacent to the mercury distilling apparatus is a second automatic pumping and flushing apparatus, similar in many respects to the apparatus shown in Figs. 1–5, but with some variations which are clearly brought out in Figs. 7–9. In this apparatus the bed plate 90 has a spider 91 rotatably supported thereabove in a manner similar to that in which the bed plate 1 supports the spider 3. A spider 91 is likewise intermittently rotated by means similar to that employed to rotate the spider 3. Since this part of the construction has been fully set forth in connection with the first machine, further description thereof is believed unnecessary. At its outer edge the spider 91 carries the hollow arcuate segments 92, which are similar to the segments 4. Water for cooling the segments 92 is admitted through the pipe 93 to an open tank 94 supported above the spider 91, from which it flows by gravity through the tube 95 to one of the segments 92, passing through each segment 92 in turn by means of suitable connections and passing out through the tube 96 to a centrally located point where it discharges into a suitable drain.

A rotary valve similar to that of the first machine is employed in this machine, the ports in the movable plate being connected to the tubes 97, which in turn connect with the upper end of rubber tubes similar to the tubes 31 of Fig. 3 which extend downwardly through the segments 92. The lower ends of these tubes carried by the segments 92 are adapted to receive the tubulations 33 of the switch bodies 34. It is thus apparent that this part of the construction is practically identical with the corresponding part of the first machine, with the exception that the switch envelopes 34 are here suspended below the segments 92, whereas they are carried above the segments 4 in the first machine.

The connections of the ports in the fixed part of the rotary valve will now be described. The port which connects with each tube 97 as it terminates at the position marked "seal off", is a blank, being closed off at the rotary valve, as are the three succeeding ones in a counterclockwise direction. Continuing in a counterclockwise direction, the next port, and each fourth port thereafter is connected through the manifold 100 and the tube 101 to a vacuum pump, suitably driven, which has sufficient capacity to substantially evacuate the system connected thereto during the rest period of the segments 92. The next succeeding port, and each fourth port thereafter, is connected through the manifold 103 and tube 104 to a vacuum pump 105 which has sufficient capacity to maintain and perfect the vacuum. The next port, and each fourth port thereafter is connected through a manifold 106 and tube 107 to a vacuum pump 108 of sufficient capacity to maintain a vacuum in the previously exhausted system. The remaining ports, with the exception of the last before that connected to the seal-off position are connected through a manifold 109 and tube 110 to a suitable source of hydrogen. The last port is connected through a tube 111 to the hydrogen source through a special conditioning system. The hydrogen passes through a heater 112 wherein it is passed over copper to remove oxygen therefrom, thence through a chemical purification system 113 and valve 114 to the tube 111, from which a branch tube extends to a chamber 115, the open bottom of which is sealed by the mercury 116. The chamber 115 is connected by a cable 117 to the counterweight 118, the cable 117 passing over a suitable pulley system. The weight 118 is so chosen that it exactly balances the chamber 115 when the hydrogen pressure in said chamber is one inch of mercury less than atmospheric pressure. The actuating lever of the valve 114 is connected to the cable 117 in such fashion that movement of the cable due to a decreased pressure in the chamber 115 opens the valve 114, the pressure in the chamber 115 thereupon being increased until the balance is restored, which moves the cable 117 back to a normal position, and closes the valve 114. By this means the hydrogen is admitted to a switch envelope 34 just before sealing-off in a very pure condition, and at a desired pressure.

An oven 121 is supported by the bed plate 90 below the segments 92 in such position as to inclose a switch member 34 while connected to each of the three vacuum pumps 102, 105 and 108 for the second time, a slot 122 in the top thereof allowing free passage of the tubulations 33. The oven 121 is heated by flames from perforations in the pipes 123, which are supplied with a suitable mixture of gas and air through the tube 124. The oven is maintained at a temperature which is just sufficient to raise the switch envelopes 34 to a temperature just below that at which distillation of mercury will occur.

A pipe 126, which connects to a suitable source, supplies air under pressure to the jets 125 and 127. Said jets 125 direct a cooling stream of air about the tubulations 33 at each position of rest within the oven 121, thereby protecting the rubber tubing in which the tubulations 33 are inserted from the heat of the oven. The jets 127 are arranged to direct their cooling streams of air over the envelopes 34 at each position of rest from a position near the oven 121 almost to the seal-off position, the envelopes 34 being sufficiently cooled thereby to be at room temperature when they receive their final hydrogen filling.

Mounted on the bed plate 90 below the "seal-off" position is a plate 128 through which loosely passes a rod 129 which is in axial alignment with the tubulation 33 of a switch envelope 34 which is at said "seal-off" position. The rod 129 supports the seal-off burners 130 in such a position that their flames converge from opposite sides on the tubulation 33 slightly above the envelope 34. Gas and oxygen are fed to said burners 130 in proper proportions through the automatic pressure regulating valves 131 and 132 and suitable connections. A compression spring 134 which surrounds the rod 129 and bears against the plate 128 at one end and an enlargement of the rod 129 at the other normally maintains the jets 130 at their upper limit of travel. A handle lever 133, one end of which rests against the lower side of the plate 128, and which at an intermediate point engages the lower end of the rod 129 provides means both for rotating the jets 130 through an angle of approximately 90° and for lowering them through the amount allowed by compression of the spring 134, the end of lever 133 bearing against the lower side of the plate 128 at any rotative position.

In the use and operation of the apparatus of my invention, the first pumping and flushing machine being in operation with all flames lit and motors running, and each of the tubes 31 closed either by a switch body or a tube having a closed end, the switch body or tubing contained by each of the tubes 31 is removed as it reaches either of the positions A and the tubulation 33 of a switch envelope 34 greased and inserted therein. As the machine rotates the envelope 34 is carried to the first pumping position which is just outside the oven 50. Any leak in the envelope 34 which results in failure to produce a vacuum therein is indicated on a suitable manome'er connected to the manifold 37 and a new envelope can be immediately inserted in exchange therefor, thus avoiding contamination of the other envelopes 34 which are connected to the same manifold. At the next movement of the Geneva gear 2 the envelope 34 is carried into the oven 50, the temperature of which is sufficient to drive off any gases which may be occluded in the walls of the envelope 34. Then at successive steps it is connected to the manifold 41 for further pumping, and to the manifold 45 where it is flushed with hydrogen, thereafter being repeatedly connected in cycles to manifold 37, to manifold 41 and to manifold 45, thus being repeatedly evacuated and flushed. After the envelope 34 has passed about half way around the machine it emerges from the oven 50, and thereafter is cooled by jets of air from the pipe 55 which cool it down to room temperature by the time it reaches the rest position before the leading positions A. At this last position the evacuated envelope is connected to the nitrogen source by the rotary valve, and receives a filling of nitrogen at atmospheric pressure and temperature. At the next stop the envelope 34 is removed from the machine and another inserted in place thereof. While the envelope 34 was being thus treated other switch envelopes 34 were being inserted in each succeeding tube 31 as it reached a loading position A, each of which in turn goes through the same cycle as has just been described.

The switch envelope 34 with its filling of nitrogen is then filled to the proper degree with mercury 36 by inserting the hollow needle 85 through the constriction in the tubulation 33 and opening the valve 83. Due to the fact that the mercury, which has been distilled in a vacuum and stored in a hydrogen atmosphere to maintain its purity, is thus admitted directly to the envelope no possible contamination of the switch envelope 34 with oxygen, water, vapor or other deleterious substance is possible. Furthermore, the nitrogen being of approximately the same density as air fails to diffuse with the outside air to any appreciable extent through the constricted tubulation 33, and thus the envelope 34 is maintained substantially free from deleterious contamination during this interval when it is open to the atmosphere. If desired, the envelope 34 can be inspected at this stage to insure that the proper amount of mercury has been inserted therein to insure proper operation thereof.

The second pumping and flushing machine now being in operation with all flames lit and all motors running, and each of the tubulation connections being closed either by a switch body or the sealed tubulation resulting from seal-off of an envelope 34, a sealed tubulation coming from the seal-off position is removed from one of the tubulation connections on the three succeeding segments 92 at one of the three succeeding blank positions, and the switch envelope 34 containing the mercury 36 inserted in place thereof. As the machine rotates the envelope 34 is connected first to the manifold 100, where it is thoroughly exhausted, and then in succession to the manifolds 103 and 106, where the vacuum is maintained or improved. The next step connects the envelope 34 to the manifold 109, whereupon it is flushed with hydrogen. Further rotation of the machine causes these operations to be repeated in cycles until the last position before the seal-off position is reached. At this position the envelope 34 is connected with the tube 111, through which it receives a filling of hydrogen at a pressure which is one inch of mercury less than atmospheric. During the second of the pumping cycles just described the envelope 34 is within the oven 121 in which it is heated as hot as possible without distilling the mercury in order to drive off any traces of occluded gas or water vapor. After emerging from the oven 121 the envelope 34 is cooled by air from the jets 127 so that it is at atmospheric temperature when it receives its final hydrogen filling. The tubulation 33 is then sealed-off close to the envelope 34, the burners 130 being moved through suitable manipulation of the handle 133, and the sealed switch 34 removed. In operation, each of the tubes 97 has a switch 34 connected thereto, the operations being performed upon each in turn as above described. After each switch 34 is removed the sealed tubulation 33 is discarded and a new envelope 34 connected in place thereof which is evacuated, flushed, and so on, in the same manner as the envelope 34 which it replaced.

In certain cases it may be found desirable to use a gas such as ammonia, anhydrous if desired, for arc suppressing purposes in the mercury switches. Due to the density of this gas it is possible to substitute it for the nitrogen filling in the preferred process set forth above, in which case the switch may be sealed-off immediately after the introduction of the mercury, the pumping and flushing of the second machine being thus dispensed with.

While I have described certain steps of my process as being performed by machine it will be readily understood that where desired these steps may be performed by hand to meet the needs of any particular conditions of manufacture. It will be further understood that while I have used mercury switches to illustrate my invention, the process and apparatus is equally useful in the manufacture of similar articles in which a liquid must be inserted in an envelope from which all oxygen, water vapor, and other undesirable impurities have been removed, without re-admitting such impurities. It is likewise obvious that other gases than nitrogen or ammonia may be used as the envelope filling during exposure to the atmosphere, and that other variations in the steps of the process or in the apparatus may be made without departing from the spirit of the invention.

I claim:

1. The method of producing a sealed envelope containing a liquid which comprises removing all deleterious gases and vapors from a tubulated envelope, filling said envelope with a non-deleterious gas having a density not appreciably less than that of air, introducing a fluid, replacing said gas with a suitable arc suppressing atmosphere, and sealing off said tubulation.

2. In apparatus for the manufacture of sealed envelopes containing a liquid, means to remove all occluded gases and vapors from a tubulated envelope, means to fill said envelope with a non-deleterious gas having a density not less than that of air, means to introduce a liquid which has been freed of all deleterious gaseous impurities into said envelope without re-admitting deleterious gases and vapors, means to replace said gas with a suitable arc suppressing atmosphere and means to seal off said tubulation.

3. In apparatus for the manufacture of sealed envelopes containing mercury, means to remove all occluded gas and vapor from a tubulated envelope, means to fill said envelope with nitrogen, means to introduce therein mercury which has been freed of occluded gas and vapor, means to replace said nitrogen with hydrogen and means to seal off said envelope.

Signed at Hoboken in the county of Hudson and State of New Jersey this 26th day of April A. D. 1929.

WARREN R. WALKER.